United States Patent [19]
Nobis

[11] 4,351,049
[45] Sep. 21, 1982

[54] CIRCUIT ARRANGEMENT FOR USER STATIONS IN A COMMUNICATIONS NETWORK

[75] Inventor: Rolf Nobis, Berlin, Fed. Rep. of Germany

[73] Assignee: Heinrich-Hertz-Institut für Nachrichtentechnik Berlin GmbH, Berlin, Fed. Rep. of Germany

[21] Appl. No.: 92,928

[22] Filed: Nov. 8, 1979

[30] Foreign Application Priority Data

Nov. 8, 1978 [DE] Fed. Rep. of Germany ....... 2848931

[51] Int. Cl.³ .......................... H04J 3/16; H04J 6/02; H04Q 11/04
[52] U.S. Cl. ....................................... 370/62; 370/80; 370/85
[58] Field of Search .................. 370/85, 89, 95, 93, 370/86, 62, 80

[56] References Cited

U.S. PATENT DOCUMENTS

| 3,790,717 | 2/1974 | Abramson et al. | 370/67 |
| 3,856,993 | 12/1974 | Closs et al. | 370/85 |
| 4,271,506 | 6/1981 | Broc et al. | 370/89 |

FOREIGN PATENT DOCUMENTS 2601241 7/1977 Fed. Rep. of Germany.

Primary Examiner—Thomas W. Brown
Attorney, Agent, or Firm—Spencer & Kaye

[57] ABSTRACT

User stations for digital time multiplex communications networks with decentralized exchange which are provided with basic equipment, independent of the structure of the network, composed of modular units which are used according to the requirements of the user, the service to be performed and the structurally given conditions are further provided with an additional equipment performing features including call transfer, call diversion, automatic call transfer, etc.

3 Claims, 4 Drawing Figures

CIRCUIT ARRANGEMENT FOR USER STATIONS IN A COMMUNICATIONS NETWORK

BACKGROUND OF THE INVENTION

The present invention relates to a circuit arrangement for connecting user instruments at user, or subscriber, stations to a digital time multiplex communications network with decentralized exchange.

U.S. patent application Ser. No. 78,908, filing date Sept. 25, 1979, now abandoned, discloses a digital time multiplex communications network operating simultaneously for a plurality of different kinds of user instruments and having a decentralized exchange and a plurality of user, or subscriber, stations, with each user station being associated with at least one user instrument of at least one kind of user instruments, wherein the improvement comprises: separate signal conducting lines in each user, or subscriber, station for the conduction of signals in the transmitted and received directions, respectively, of the respective station; and autonomous units including identical channel occupation check units each connected in a respective station, and identical groups each composed of a connection control member and a format converter, with each such group being connected to a respective user instrument and to the channel occupation check unit, respectively, in that user station.

In time division multiplex systems with decentralized exchange, the subscriber stations are of particular importance from an engineering point of view and thus also from an operational and economical point of view. They must perform completely identical functions with the highest reliability at certain points in the network which have a high user density, which means at very many points of the network. Consequently, a considerable amount of the total installation costs falls onto these decentralized subscriber station exchanges.

It is well known from conventional centralized switching networks, e.g. from extensions, especially PABX, that call transfer, diversion of an existing connection or a connection which is to be built up, respectively, is possible and often done. Competitiveness of systems with decentralized switching is increased by offering such well-known features to the user in the same or even more comfortable manner.

An important step was taken in this direction by the Hasler AG, Bern (Swisse) with their Laboratory system for integrated local communication. The "Report 148 of the Int. Switching Symp. - ISS'74- Munich, Sept. 9 to 13., 1974" shows that in this system consisting of a closed ring main, or loop with decentralized exchange, such features as call back, call indication and call transfer are included. In the beginning of this report—page 148/1, right column, second paragraph—there is a statement, that each subscriber station is able to build up and terminate a connection without any cooperation of a central controling unit. This includes the features described above. There is, however, a more detailed description concerning call transfer—pages 148/2 and /3, last paragraph of part 3— explaining that this feature is realized only for external calls and requires additional functions at an interface station. In order to materialize this the interface station has got to be equipped with three address registers, (S-sending address register; R—receiving address register; A—auxiliary/additional address register) like the subscriber station in the main ring. Two of them, the S-register and the R-register, are needed for simple connections. During such a connection the subscribers in the ring main exchange information as blocks of data, including the respective addresses. The A-registers serve to execute the features requested and store the contents of the R- and S-registers, respectively, by pressing one of the buttons (Asterisk) or red, and # (rhomb) or green.

SUMMARY OF THE INVENTION

It is therefore an object of the present invention to include the average standard features for subscriber equipment such as call transfer, diversion and automatic transfer by using the circuit arrangement for a subscriber station as disclosed in U.S. application Ser. No. 78,908 and mentioned above under extensive use of the modules described there. Objects of the invention are achieved by providing a circuit arrangement for a user, or subscriber, station with an additional connection control member and a storage register set, and by a software modification of the dialing control for operation together with an additional switching unit attached to and connected with a user instrument. This way a second connection can be established and maintained parallel to the first one and a call transfer from the first to the second connection could be realized, respectively. Thus, a subscriber B who is maintaining a connection with a subscriber A through an up and down channel by means of two adjacent time slots of a time frame, is able, for example, to build up a call back connection with a subscriber C without disconnecting the connection with subscriber A. For this purpose two additional time slots become necessary, which are connected by the additional connection control member. If subscriber C wants to take over the call from subscriber A, the information is fused through the storage register set of subscriber B, whereby each cell of the storage register set transfers the time slot contents coming from subscriber A to subscriber C, and vice versa. This means that by cutting out the format converter and the user instrument of subscriber B's equipment, the information arriving at subscribers A and C is stored by subscriber B and sent on to subscribers C and A.

All features which can be lead back to this procedure could be realized by combining the steps described above, respectively. It is thereby, as before, guaranteed that no unauthorized subscriber has access to information not addressed to him. A fundamental advantage is the completion of these features without any additional central processing unit in a circuit arrangement for a user station, and the embodiments of the invention can therefore specially be put to use at such communications networks with decentralized exchange, where no central processing unit is planned. This concept is therefore not dependent on the structure of networks with decentralized exchange and allows providing the features in question not only in a PABX but also in the complete corresponding network.

Due to the identical structural design of the connection control members, particularly advantageous embodiments of the invention can be provided with transverse connections between the connection control members for user instruments belonging to the same bandwidth class. Such transverse connections permit an alternative utilization of connection control members, i.e. if a connection has already been established for a certain service, a second, additional connection for the same service, e.g. a call-back connection, can be established and maintained by the second connection control member via the transverse connection.

The switching unit attached to and connected with the user instrument can be self acting together with the dialing control, modified in its software correspondingly, when set by the user into a position activating the features in question. Thus, if a call arrives at this user's station, at the same time a second connection is built up automatically between this user's station and a predetermined third user station of the network. This means, if a user, or subscriber, is not reachable at his user station and if he has activated the switching unit associated with his user instrument, the switching unit, together with the dialing control, simulates action by the user. As a result, for the duration of the absence of a subscriber, or user, a call transfer from the incoming first to the outgoing second connection takes place automatically. A central station as a predetermined third user station of a PABX as well as user stations where more than one call transfer will take place at the same time are to be provided with more than one additional connection control member and storage register set, and the dialing control belonging to such a user station is to be modified in its software correspondingly.

According to U.S. application Ser. No. 78,908, in a user station the channel occupation check unit is provided with time slot counters for the transmitting and receiving directions and with a detector for unoccupied time slots as well as a comparator for the recognition of the own user address. The connection control member serves to establish, to continously control, and to release, or terminate, a connection as well as to properly perform the transmission of data during an established connection. The format converter adapts the word structures specific for the end instruments to the transmission.

Channel occupation check units are of completely identical structure and merely contain, in the comparator for the recognition of the own user address, a memory programmed for this individual address. The connection control member and format converter are also of completely identical structure, independent of the services or user instruments for which they are used and can be given a fixed program, for example, for the intended purpose or can be set to the desired function merely by connecting them to the user instrument.

The significant advantage of the present invention is that this basic equipment for a user station, except for the additional storage register set, consists of modules which are identical with those of a user station disclosed in U.S. application Ser. No. 78,908. For networks which operate at a higher transmission rate, or information density, embodiments of the invention include, in the line which connects the individual user station rather than in the user station itself, rate converters between the transmission line and the user stations, which converters are common to all user stations connected to the high transmission rate line via one and the same junction and are connected to a junction for coupling in and out. These converters include parallel/series converters or series/parallel converters, respectively, for the transmitting and receiving directions, respectively. Such embodiments of the invention are desirable whenever the transmission line connecting the user stations is very long, i.e. extends through the entire area of the decentralized exchanging network.

As already known from prior art publications, digital time multiplex data networks operate with systems in which the signals characteristic for the frame structure and required for synchronization are also carried over the transmission line for the useful information. At the junction points in the network, these embodiments therefore include devices for the recovery of such signals. These devices are also common to all user stations connected to one and the same junction of the network and are disposed between these user stations and the transmission line.

In conventional telecommunications networks, the user connecting lines have an average length of 1300 m. They lead from a central point within the exchange area, e.g. from an exchange office, to the end stations. During the introductory phase for new communications systems, these user connection lines can continue to be used, in embodiments of the present invention, if a line matching unit is provided for each user instrument connected to a user station. The user stations, including the line matching unit and the units for supplying the user device, can then be accommodated and disposed at the previous central station in the exchange area.

Those parts of circuit arrangements for user stations performing identical tasks for a number of locally concentrated user stations not only perform exchange functions but also concentrator functions. The concentrator functions are a security measure, too. Since such electronic devices can be arranged remote from the user, unauthorized manipulations by an individual user are excluded. This also decreases the chances of malfunction since there exist only a number of junctions smaller than the number of user stations. This again makes the network easier to maintain since the respective electronic components are disposed outside of the area which is accessible only with permission of the user.

The units required to supply clock pulses in systems without separate lines, i.e. rate converters and units for the recovery of clock pulses and synchronization, are designed so that only that part of the total number of individual tasks is performed there which is independent of the plurality of individual services and of the number of user stations disposed at an individual junction.

These individual tasks are still nonspecific with respect to individual services and with respect to the number of user stations. Functionally, the result is a user specific operating, but service nonspecific designed, module for each connected user station, this module being the channel occupation check unit. This unit monitors for the respective user—in his capacity as calling or called party—the deeentrally exchanged channels required for the individual connections, i.e. it determines whether a particular channel is free, whether it is occupied by a connection with the respective user, or whether it is occupied by other users.

The modules with which individual functions are performed are each assigned to a type of end instrument but are designed to be service nonspecific. That means that, depending on the type, or kind, of end instruments a user operates, his station is equipped with at least one set of such modules of identical structure. The degree of expansion is left up to the user, i.e. he can decide at any time whether he wants to be equipped with only one end instrument, e.g. a telephone or television receiver, or a number of different instruments, or, additionally, a number of identical instruments in parallel. Of course, the various end instruments of one user can be used to simultaneously establish connections—if channels are found to be available—with corresponding end instruments of other users.

To all embodiments of the invention it applies in general that a uniform transmission clock pulse and a uniform time multiplex frame exists in a digital time multiplex communications network, generated by a time frame generator which periodically transmits a series of time slots and an associated synchronizing block. This synchronizing information, required by each user station for its transmitting as well as for its receiving directions, travels from the time frame generator either through separate control lines or through the transmitting and receiving lines, and possibly through sync information reflectors at the ends of network branches, to the individual user stations. Each time slot in the time multiplex frame of the receiving line is thus identical with the respective time slot of the same ordinal, or position, of the transmitting line.

For the duration of a connection, the ordinal of a time slot serves as the connection criterion so that after a connection has been established no separate identification of the transmitted data with the target address is required.

In order to transmit or receive, respectively, the data and signals at the correct time slot and with the transmission clock pulse, and to combine them from, or deliver them to, the individual end instruments, it is thus necessary to perform a bit, time slot and frame synchronization for the transmitting and receiving lines, alternatively store the contents of a whole received time slot, recognize the calls or signals, forward the data blocks intended for the particular user, transmit data and signal blocks, receive sync blocks for frame synchronization, and store the data to be transmitted. A program is required for the entire sequence to establish and actuate a connection under consideration of the various services and performance features. This program branches out into different paths according to the manually fed-in signals or according to the signals received over the receiving line.

DESCRIPTION OF THE PREFERRED EMBODIMENTS

Figure 1:
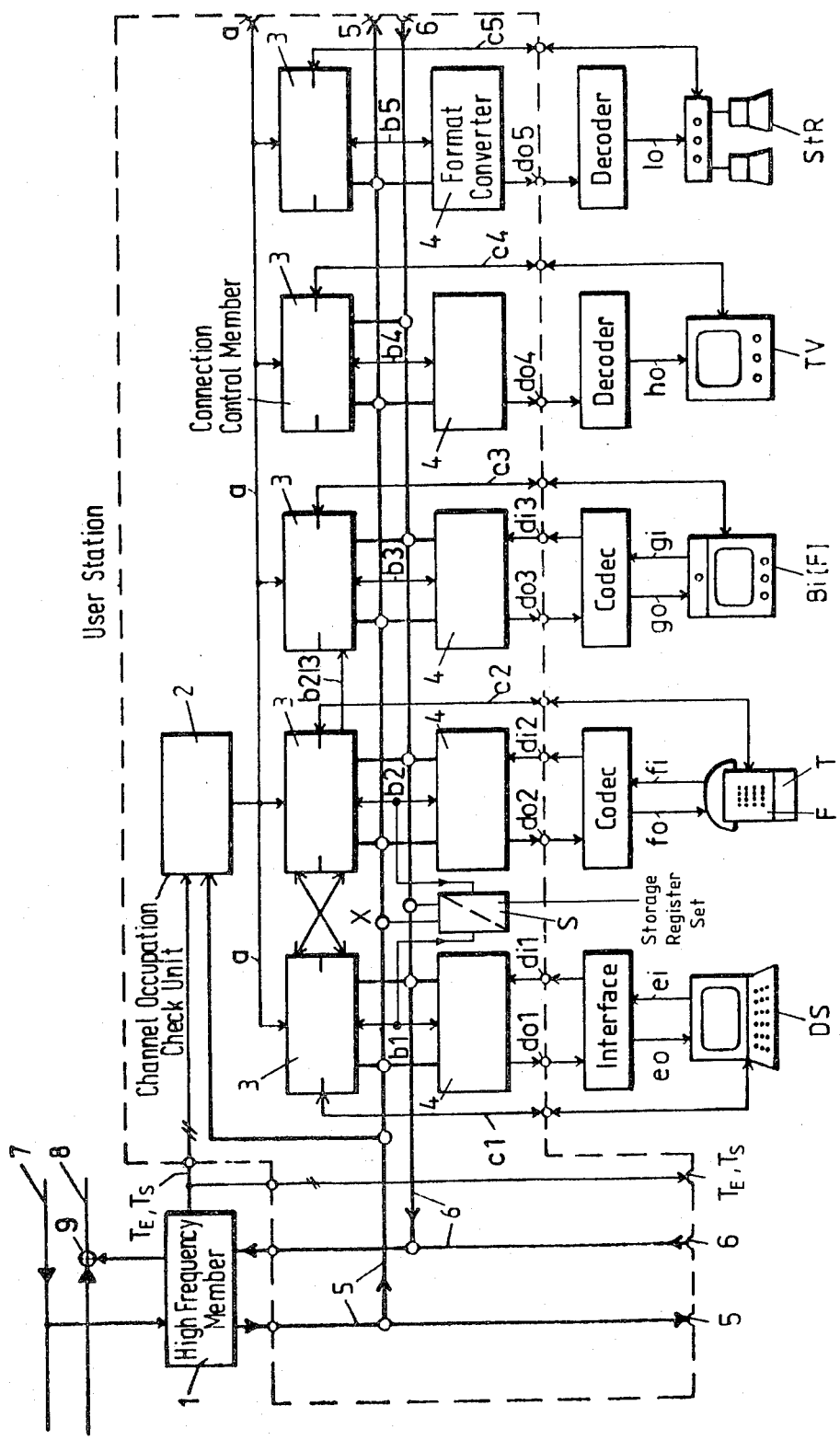
FIG. 1 is a block circuit diagram of a user station according to the invention.

FIG. 1 shows a user, or subscriber, station, a receiving line 7 and a transmitting line 8 for serial data in a network having double lines which may be branched or unbranched and which simultaneously serve to supply the clock pulses needed for control of the data flow. Between these lines 7 and 8 and the user station, a high frequency member 1 is provided for this purpose and is equipped with rate converters and devices for clock pulse recovery and synchronization. This high frequency member 1 may be eliminated completely or in part if the data are conducted in the transmitting and receiving lines at a rate which is equal to the internal operating rate of the user station and separate lines come from the system time frame generator to supply the user station with clock pulses. The devices for clock pulse recovery determine the word and frame clock pulse pattern for the transmitting and receiving directions with which the subsequent units are controlled.

Signals transferred from the receiving line 7 to an internal received data bus 5 of the user station are checked in a channel occupation check unit 2 for the presence of free time slots and for an indication of whether the respective user station is being called. The unit recognizes this by a comparison of its own individual calling number with the target, or called party, addresses received via the received data bus 5. The received data bus 5 and a transmitted data bus 6 are connected to units for the individual services which are of identical configuration but are each designated for a specific service.

Each unit includes a group of devices including a connection control member 3 and a format converter 4. Between two of these groups, each composed of a connection control member 3 and a format converter 4 and each belonging to a telephone F or a data viewer DS, respectively, there is provided a storage register set S which is connected to the received data bus 5 and to the transmitted data bus 6 as well as to both of the connection control members 3 for control. Transverse, or crossover, connections X may be provided between connection control members 3 of the same bandwidth class. For example, it may occur that a call-back connection between the telephones of two user stations will be established by the calling back user station via the control member 3 belonging to a data viewer unit of the calling back user station while an ongoing local telephone connection is established via the control member 3 belonging to the telephone unit of the calling back user station. Thus the connection control member 3 belonging to the data viewer unit of the calling back station serves as the additional connection control member needed for providing the features according to the invention.

In the illustrated embodiment, a data viewer DS, a telephone F, a screen Bi (F) for video telephone operation, a television receiver TV and a stereo radio StR are connected to the system. These end instruments are each provided with an associated interface, or codec (coder/decoder), or decoder, respectively, and are disposed at not too great a distance from the user station so that all required lines can be brought in parallel from the user station to the respective end instruments.

Such a user station can be expanded for further services in a very simple manner by addition of corresponding connection control members 3 and format converters 4. Moreover, there exists the possibility of connecting further user stations to the lines 5 and 6 leading to the high frequency member, or concentrator, 1. Thus, features in question are to be realized between two user stations connected to one and the same junction, too.

The high frequency member 1 may be equipped with devices for rate conversion and for clock pulse recovery, or one of these devices. For example, a sync unit is provided for the receiving direction and a sync unit for the transmitting direction to derive the associated signals, including bit clock pulse $T_E$ and word and frame clock pulse $T_S$, from the data in the receiving line 7 or in the transmitting line 8, respectively. These sync units may be eliminated if these signals are provided through separate lines directly to the user station. Between the receiving line 7 and the received data bus 5, a series/parallel converter is provided, while between the transmitting line 8 and the transmitted data bus 6, there is provided another parallel/series converter. Data is supplied from the latter converter to transmitting line 8 via an associated summer 9. The transmission rate conversion produced by these converters can be eliminated if the data are conducted in the receiving line 7 or in the transmitting line 8, respectively, not serially but in parallel and at the same rate as in the transmitted data bus 6 or received data bus 5, respectively.

Figure 2:
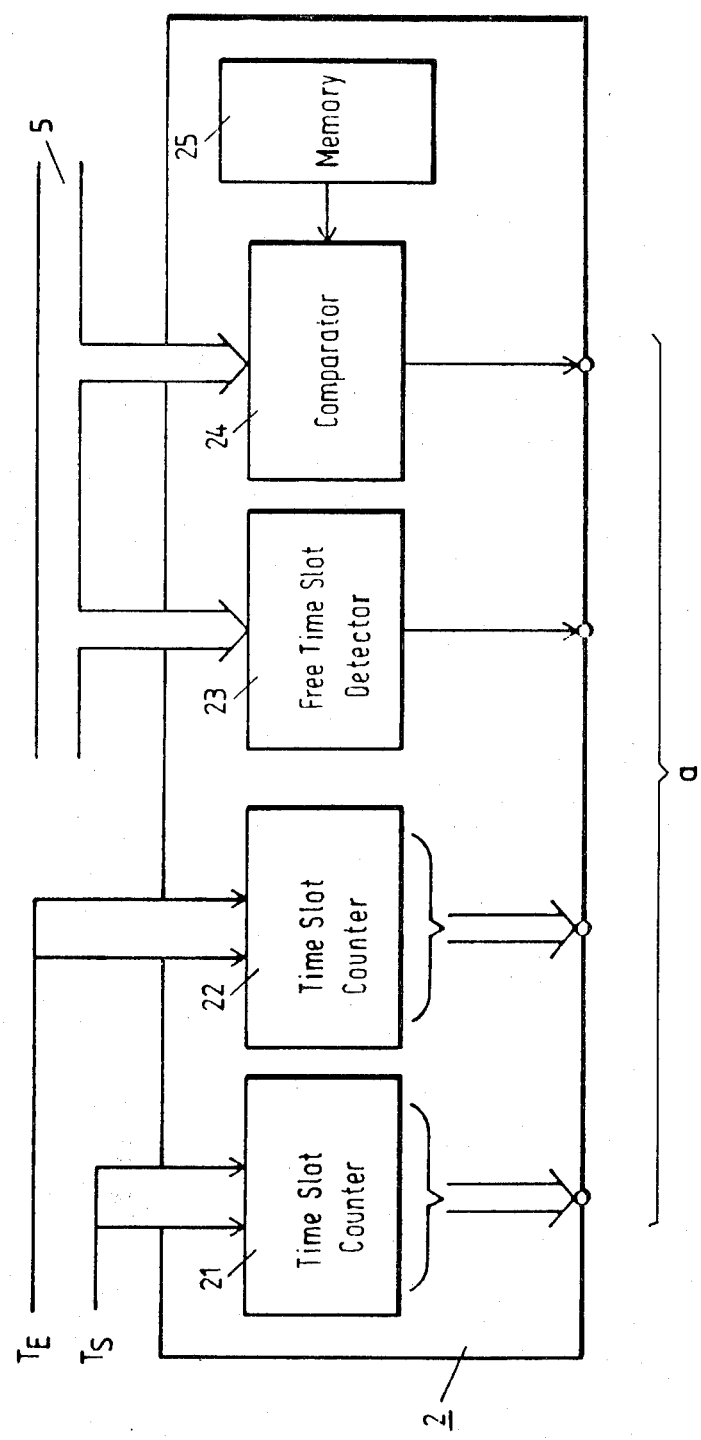
FIG. 2 is a block circuit diagram of a channel occupation check unit of the station of FIG. 1, as it is required for every user station.

FIG. 2 shows the basic structure of one embodiment of the channel occupation check unit 2 of the station of FIG. 1. A time slot counter 21 here determines in response to the word and frame clock pulse $T_S$ the identity, or position, of the time slots for the transmitting end. A correspondingly designed time slot counter 22 performs the same function at the receiving end. From the data received via the received data bus 5, a detector 23 determines whether free time slots for establishing a connection exist in the time frame. A comparator 24 is connected to a memory 25 providing the call number of the associated user station and serves to recognize the call directed to the respective user station.

The channel occupation check unit 2, which is supplied with the bit, word and frame clock pulses either directly or indirectly, observes the channels of the entire data flow. It is there determined whether a channel is free, is occupied, or is occupied by the associated user station's own signals. The result of this determination is forwarded in the form of digital signals (free, call, busy) to the subsequent modules. At the same time, the ordinal, or position, of the channel being monitored is forwarded. The actual channel ordinals are recorded by the time slot counters in unit 2 with the aid of the word and frame clock pulses at the transmitting and receiving ends and are fed to the subsequent modules.

Figure 3:
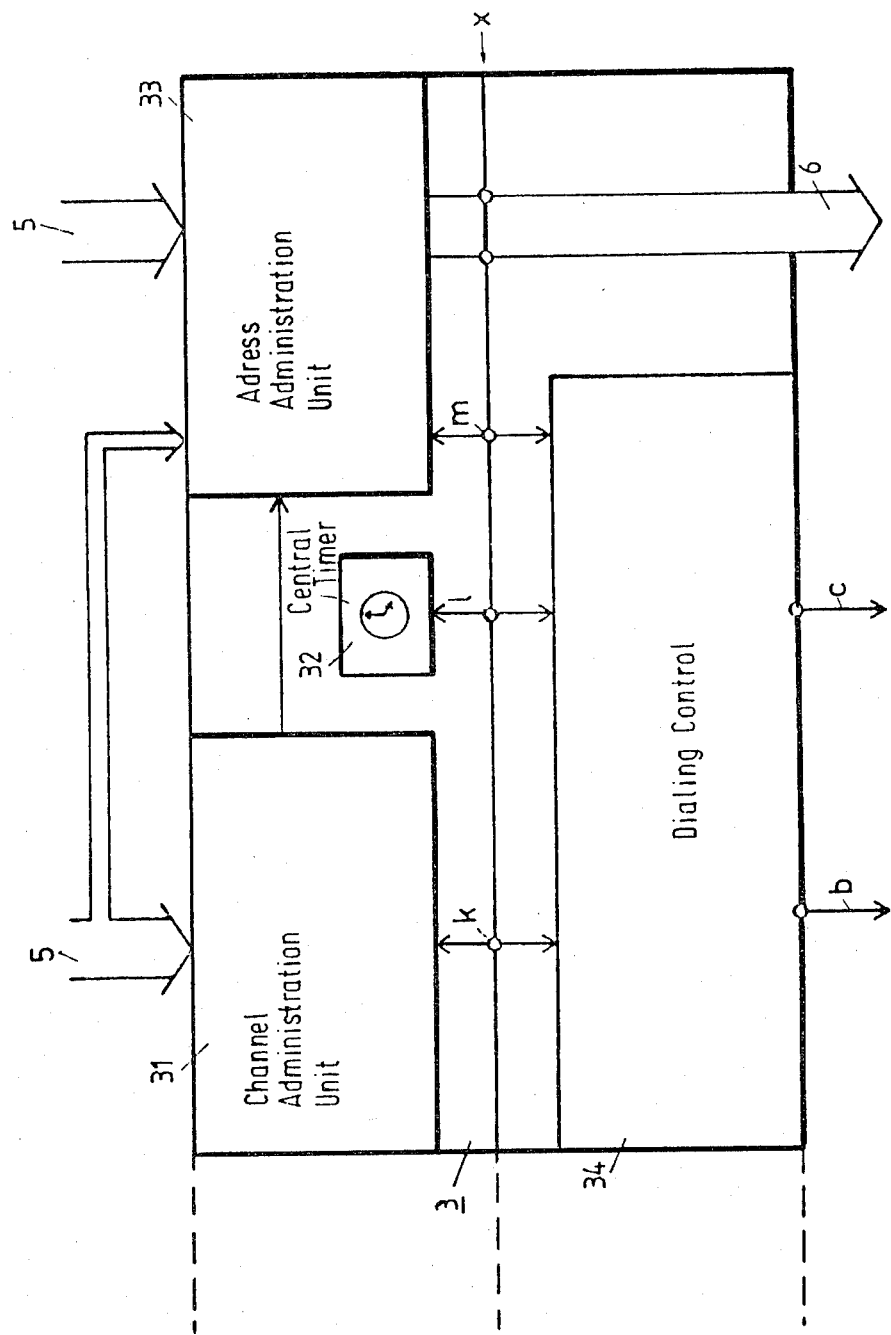
FIG. 3 is a block circuit diagram of a channel and user specific connection control member of the station of FIG. 1.

FIG. 3 shows one embodiment of a connection control member 3 which essentially includes four parts, i.e. a channel administration unit 31, a central timer 32, an address administration unit 33 and a dialing control 34. The operation of these parts will be explained below in connection with the description of the establishment and termination of a connection.

The user units of each connection control member 3 correspond to one another and may be designed as microprogrammable control mechanisms or microprocessor controlled units. It is here that the sequence algorithms for the end, or user, instrument are controlled, such as, for example, lifting the receiver and dialing of digits, and corresponding receipt signals are emitted, such as call tone, dial tone, free signal, etc. Depending on whether a call is arriving or a connection is to be established, the unit components activate one another in an orderly manner. With incoming calls, identification of the received channel is stored and the identity of the associated transmitting channel at the transmitting end is determined.

In the signaling state of a connection, a dial set and a call receipt register cooperate and obtain the selection in the proper channel from the dial set, or they feed it into a call receipt register for further evaluation, respectively.

Format converter 4 is operated by the dialing control 34 shown in FIG. 3 and serves the purpose of converting the series/parallel converted data from the received data bus 5, with the aid of a RAM memory and a data switch, into equidistant bit groups whose width is externally determinable by programming a control in conjunction with a memory address to correspond via a parallel/series converter to the codec employed. In an analogous manner, the bit groups of the transmitted data, as predetermined by the codec employed, are converted, by the coder via a buffer register, a data switch at the transmitting end and a RAM, and with the aid of a control, into the bit groups of, e.g., sixteen bits each required for the transmitted data bus 6 at the transmitting end.

In the data exchange state, the data are forwarded to the end, or user, instruments via the format converter 4 or are sent out from there, respectively. In the receiving direction, the format converter 4 receives the parallelized data in the proper channel and converts them into equidistant groups of bits. At the same time, the accompanying clock pulse is fed into a series-connected decoder to cause it to operate. In the transmitting direction, the format converter 4 furnishes equidistant charging clock pulses for the reception of groups of bits from the coders of the end instruments. These groups of bits are collected by the format converter 4 and processed into a complete time slot which is then transferred to this network with the aid of the signals from the time multiplex communications network. The width of the groups of bits transferred to the end instrument or to be received by it, respectively, can be fixed by programming in the end instrument connector. Based on a maximum width of 16 bits, a reduction to for example 8 bits, 4 bits, or 1 bit can be made. The same programming can also associate charging clock pulses.

A connection between two user stations is established and terminated only via connection control members 3 of the respective user stations. The end instrument in question, which may be one of those for two way communications shown in FIG. 1, gives the destination, or called party, selection to the dialing control 34 in a selection recording set. When dialing is completed, the channel administration unit 31 of the connection control member 3 of the calling party searches, with the aid of detector 23 of unit 2, for a time position, or slot, available for this service on received data bus 5 and on transmitted data bus 6. Such a free time position is identical with associated free time slots in receiving line 7 and transmitting line 8, respectively.

If such a free time position has been found, it is occupied. The occupation is effected by a "connection established" signal. This signal is composed of a service identification from the dialing control 34, the target address from the selection recording set of the dialing control and the own address from memory 25 of unit 2.

The position of the occupied time slot with respect to the time multiplex frame is stored in a time slot ordinal memory of the channel administration unit 31 of the connection control member 3 of the calling party so that the points in time for sending and receiving are fixed for the duration of this connection. After sending the call, the information content of an acknowledgment from the called party in the receiving time slot is checked within a time period determined by the central clock pulse generator 32 in the address administration unit 33 for service identification to determine that the service is correct and via an acknowledgment comparator in the channel administration unit 31 for the correct partner address. Moreover, the channel occupation check unit 24 continuously checks the data flow with respect to its own calling address.

If all results are positive, the connection for the calling party has been established, as far as signalling is concerned, and the calling party receives a "free" signal. If the above criteria are not met within the time set by the central clock pulse generator 32, the connection is considered not to have been established.

In the case of successful establishment of a connection, the transition to the conversation state is effected in that the called party accepts the call, i.e. "lifts the receiver", and emits data instead of the call acknowledgment. The calling party recognizes this and also changes to the conversation state.

The connection is terminated when one party "replaces" the receiver, whereupon signals no longer appear in the time position, or slot, assigned to the connection. The other user station recognizes that the transmitted time slot contains no signals, or is empty, and itself terminates the connection in that it discontinues transmitting.

If a user is called, this is detected by means of the comparator 24 and the memory 25 of the called party. If that user station is not occupied, it stores, after checking acceptability, the time position of the call in the time slot ordinal memory of its channel administration unit 31. This fixes the points in time of receiving and sending also at this location. The called party answers the calling party with a call acknowledgment composed of the service identification, the acknowledged calling address and its own address. In the case where a call acknowledgment is transmitted, the user station produces a calling tone. If the call should be cancelled, the call acknowledgment is also terminated.

The transition into the conversation state and the termination of the connection take place as described above.

Figure 4:
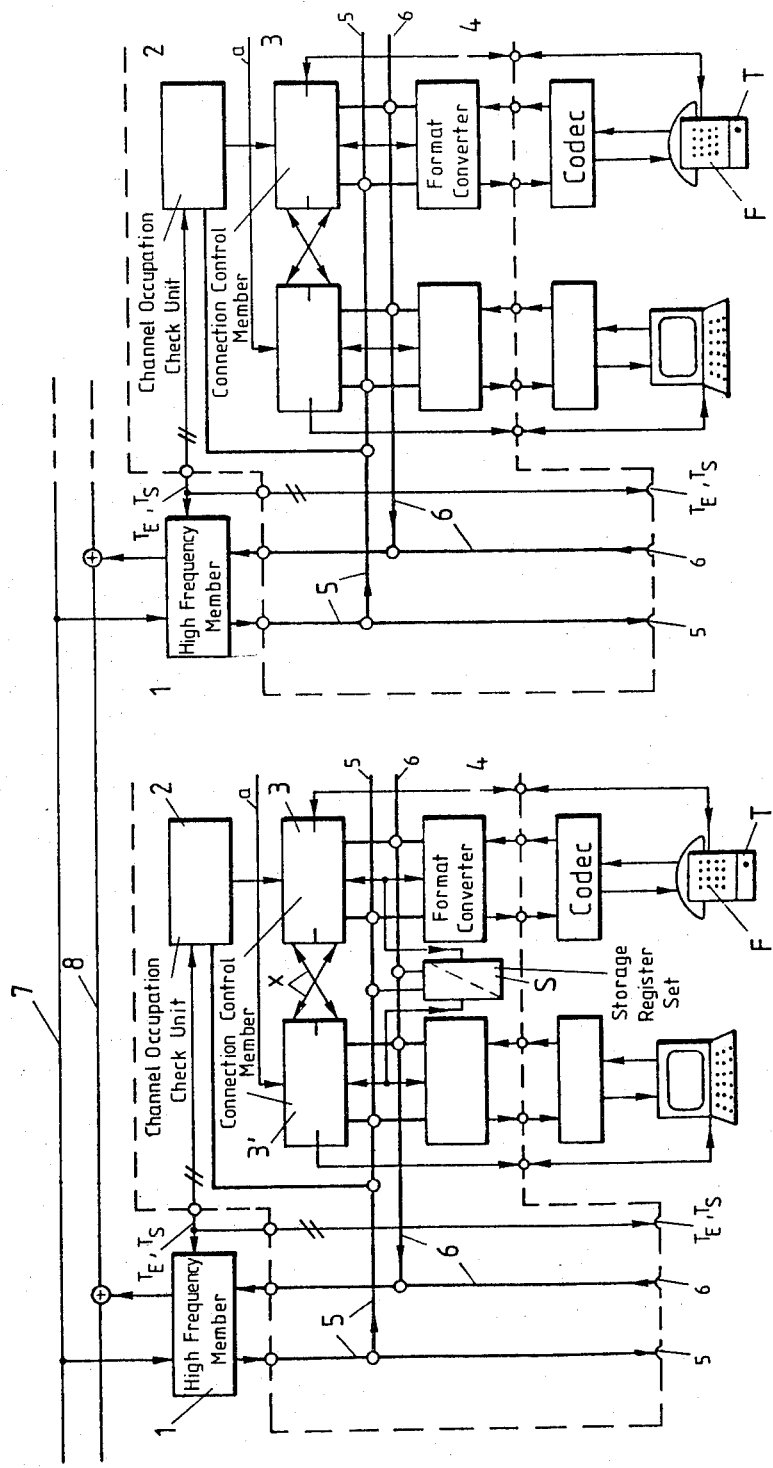
FIG. 4 is a block circuit diagram of fragments of two user stations of FIG. 1 according to the invention showing the equipment needed for special connection features.

FIG. 4 and the following schedule show which components of the system and especially of the user stations are used to build up a normal connection. In this context the left hand side of FIG. 4 should belong to a subscriber A and the right hand side to a subscriber B. Connection from A to B:
  A: F, Codec, 4, 3, 6→1,8
  8→7
  B: 7→1,5→3, 4, Codec, F
Connection from B to A:
  B: F, Codec, 4, 3, 6→1,8
  8→7
  A: 7→1, 5→3, 4, Codec, F The establishment and maintenance of a call back connection is realized in principal in the same way as with a normal connection. However, the normal connection with the concerned user station is kept in a waiting position while the call back connection is active. Waiting position means that during the call back connection within a normal connection neither information nor empty time slot content but a special content is emitted. This happens immediately after a key of the switching unit T, which can be one of the dialing keys of a telephone, too, is pressed, and used for establishing the call back connection. As the connection control member 3 is used for the normal connection, the connection control member 3' is used for the call back connection. If there is no connection control member 3' belonging to a user instrument of the same bandwidth class in a user station, an additional connection control member module must be included and connected with the connection control member 3 via transverse connections X.

In FIG. 4 where now the left hand side should belong to a subscriber B and the right hand side to a subscriber C and subscriber A is to be imagined, the following schedule for the necessary connection components can be seen.

Normal connection from A to B (with B in a waiting position):
  (call back key has been pressed already)
  B: 7→1, 5→3 (waiting position), 6→1, 8
Call back connection from B to C (call back key see above)
  B: F, Codec, 4, 3', 6→1, 8
  8→7
  C: 7→1, 5→3, 4, Codec, F
Call back connection from C to B:
  C: F, Codec, 4, 3, 6→1, 8
  8→7
  B: 7→1, 5→3', 4, Codec, F The call back connection can be terminated in two different ways.

(1) The call back key on subscriber B's side is pressed again: This clears the call back connection, which results in empty time slots being emitted, and the normal connection is returned from its waiting position.

(2) Subscriber B activates a transfer, or hand over key: this results in a call transfer of the normal connection being in waiting position. In this case the conditions which should exist are those which were explained in connection with the call back connection. As the normal connection on subscriber B's side is in a waiting position, it must be determined, during the call back connection between subscriber B and C, whether C wants to take over the call from A or not. Thus, subscriber B knows whether he should press the call back key again or whether the hand over key is to be activated. When the hand over key is pressed, the storage register set on subscriber B's side is activated. Here, an information link is established between the channels of the normal connection and the call back connection. This means the normal connection which had been transfered on B's side runs as before from subscriber A to the station of subscriber B. From there a connection is made through the call back connection to C. This results in the following schedule:

Normal connection between A and C transfered at B:
  A: F, Codec, 4, 3, 6→1, 8
  8→7
  B: 7→1, 5→3, S, 3', 6→1, 8
  8→7
  C: 7→1, 5→3, 4, Codec, F.
Normal connection between C and A transfered at B:
  C: F, Codec, 4, 3, 6→1, 8
  8→7
  B: 7→1, 5→3', S, 3, 6→1, 8
  8→7
  A: 7→1, 5→3, 4, Codec, F.

The information for each channel is kept in a working storage. A respective cell of the storage register set S is used for this purpose. This is controlled by the connection control members 3 and 3' and done by deducting the reception coincidence in the direction A-C for storing by connection control member 3, the transmitter coincidence for reading by connection control member 3', and in the direction C-A the receiver coincidence for storing by connection control member 3' and the transmitter coincidence for reading by connection control member 3.

While the normal connection between subscribers A and C has been transfered, subscriber B is able to establish additional connections such as normal connection or call back connections if the user station of subscriber B is equipped with two or more additional connection control members and storage register sets. Because a subscriber can use one and the same user instrument, e.g. the telephone, only at different times for different connections, only one format converter and one Coder/Decoder (Codec) or one interface, respectively, with its subscriber instrument is necessary for one and the same user instrument in a user station.

According to the principles for call back connections and call transfer of normal connections as explained above, it is possible to establish operation features automatically. This is done by establishing self acting switching units at the user instruments and would be for example the call diversion:

A subscriber station equipped with a switching unit T is set beforehand to establish a call back connection with a predetermined certain other subscriber station and/or whose operation has been set for call transfer. This way it is, e.g., possible to reach a subscriber during a meeting under a different number. It is possible to switch such subscribers on to an announcing service, too.

If a transfer or no reply has been activated, a call diversion can be established after a set time period. This feature is of special importance for example when a subscriber is obtainable usually at one number but sometimes at another one.

Similar to a conditioned call diversion or an unconditioned call diversion it is possible to establish diversion to another communications system, e.g. to a selective paging system. In this case for example a subscriber station of a decentralized network with wireless or wired end stations could be called instead of the subscriber station as shown in FIG. 1. As in case of such a diversion, the telephone number of the subscriber who is unobtainable can be transferred as a sender address in case of a call back connection, an encoding of the selective paging system being possible without difficulty.

Without wanting to restrict this enumeration of possible features, another case of a conditioned automatic diversion shall be mentioned:

the call transfer on busy. This means that for example the central station of a PABX accepts the call if the requested subscriber station is busy. Especially such central user stations are to be equipped with a number of additional connection control members and storage register sets in order to reduce the possibility that a busy signal occurs.

As can be appreciated from the above description, the present invention permits universal use of circuit arrangements for user stations which, according to the conditions at hand, need be supplemented by a few additional units. These additional units themselves are constructed to be user and service non-specific. Regarding the rate conversion, the high frequency member is divided into a receiving part and a transmitting part which remove data from or couple data into the network, respectively, independently of one another. With respect to synchronization, the bit, word and frame clock pulses are recovered from the flow of information and are emitted with the data in an orderly manner.

The data rate on the received data bus 5 or on the transmitted data bus 6 may be less than 10 Mbit/s so that the subsequent modules of the user stations can be designed according to a lower rate logic system which is less subject to malfunctions.

The entire stream of received data is offered to the subsequent modules for processing. At the transmitting end the data are processed autonomously and in a sequence opposite to that at the receiving end. With the aid of the furnished clock pulse derived from the network, the data are autonomously offered to the transmitting end in an orderly manner. If required, these data are brought into the proper transmitting form by parallel/series conversion and are coupled into the stream of transmitted data in an orderly manner.

The transmitting end is equipped with devices which, when there is an interruption of current flow, bridge the coupling point. Thus the stream of transmitted data can pass a malfunctioning coupling point unimpededly. Devices in question are, e.g. switching members of an electromagnetically operating which disconnects, in case of malfunction, the user station from transmitting line 8 and bridging summer 9, respectively.

In case such time division multiplex network is used as a PABX, an interface unit for the connection with the public network becomes necessary. Such interface units resemble a kind of subscriber equipment in a changed and partly enlarged concept. Among the subscribers there is no basic difference whether they are directly connected with a public network or with a PABX.

Features which till now only can be found in a common PABX could also be realized in public networks due to the embodiments according to the present invention. Due to the fact that, with different embodiments according to the invention, call back connection and a diversion of a normal connection or the respective services can be realized, and since the subscriber station which is establishing the call back connection remains activated even after a diverted normal connection, there are, as a result, no difficulties in determining which station should be charged for the call: the very subscriber station which is establishing a connection is charged. If a subscriber is unwilling to pay for a normal connection which he is asked to divert, he is able to simply refuse to divert the normal connection. During the normal connection or the call back connection with him, he can ask the respective partners to build up a new normal connection directly between each other and without him.

Regarding the use of a plurality of user stations as a concentrator, a high frequency member is required which is equipped at least with rate converters and performs all the tasks which are common and identical with respect to the user stations connected to that one and the same high frequency member.

Additionally, there is required one channel occupation check unit per user station and a group of devices including a connection control member and a format converter for each type, or kind, of user instrument. In order to reduce the number of lines in the user cable, i.e. between the user station in the concentrator and the associated end instrument, a line matching unit may be provided. This measure will be applicable in particular when the user line is very long, for example the customary approximately 1300 m. This couples the signaling signals into the data line or removes them therefrom, respectively, so that the connection between the user station and the end instrument can be effected with a maximum of three lines. These three lines serve as a path for outgoing data, a path for incoming data and ground.

The embodiments of the invention in the form of modularized user stations have the advantage that devices of this type which are installed already can be replaced, modified or expanded in modular form for all services including call transfer, call diversion, automatic call transfer, etc., offered in the communications system while maintaining the already existing and used circuits and without interfering with or influencing their operation. Likewise, with the addition of user specific and service specific operating circuit components, a concentrator can be formed which then is composed of equal priority user stations. Adverse effects as a result of malfunctions in individual services on established services are then impossible.

A further significant advantage is the universal applicability of a small number of modules which can be used again and again independent of service only by programming or just by connecting them in the requested manner. Due to the limited tasks for the individual modules, it is possible to design them according to integrated, e.g. LSI, techniques, so that the design can be very compact with a slow, malfunction-free logic system.

Test equipments of a user station according to the invention and employing devices commercially available, e.g. telephone, data viewer, television receiver, were designed and fabricated by Heinrich-Hertz-Institut für Nachrichtentechnik Berlin GmbH, Federal Republic of Germany. This work has been sponsored by the "Bundesministerium für Forschung und Technologie", Bonn, Federal Republic of Germany.

Table I following below gives an overview and explanation with respect to the units and components shown in FIGS. 1 to 4. Some of them are comparable with units and components known in the art, see e.g. "Proc. 1974 Intern. Zurich Seminar on Digital Communications" Paper D3, esp. FIG. 7 and relating specification pages D3(4)/D3(5), and are marked in Table I with a "+". Components commercially available e.g. by "Texas Instruments" are marked with "++" in Table I. Other parts, e.g. an interface, coder and the like are to be designed by anyone skilled in the art without difficulty; such devices are marked with "+++" in Table I.

Table II gives an identification of the individual connection lines connecting components, units and devices of a user station according to the invention and shown in FIGS. 1 to 4 with reference according to the explanations given in Table I.

TABLE I

| Ref. No. | device/unit/component | remarks |
|---|---|---|
| 1 | high frequency member | |
| 2 | channel occupation check unit | |
| 21 | time slot counter | (+) time slot counter (receiving line) |
| 22 | time slot counter | (+) time slot counter (transmitting line) |
| 23 | detector | (+) time slot state detector |
| 24 | comparator | (+) control signal and call detection |
| 25 | memory | |
| 3 | connection control member | |
| 31 | channel administration unit | |
| 32 | central timer | |

TABLE I-continued

| Ref. No. | device/unit/component | remarks |
|---|---|---|
| 33 | address administration unit | |
| 34 | dialing control | |
| 4 | format converter | |
| 5 | received data bus | |
| 6 | transmitted data bus | |
| 7 | receiving line | |
| 8 | transmitting line | |
| 9 | summer | |
| S | storage register set | ++4×74 LS 273; 4×74 LS 24 |
| DS | data viewer | ++ |
| F | Telephone | ++ |
| T | switching unit | +++ |
| Bi(F) | screen for video telephone | ++ |
| TV | television receiver | ++ |
| StR | stereo radio | ++ |
| | interface | +++ |
| | Codec | +++ |
| | Decoder | +++ |

TABLE II

| Ref. | line for | connects |
|---|---|---|
| $T_E, T_S$ | pulses | 1 with -all- 2 |
| a | control | 2 with -all- 3 |
| b1 | control | 3 with 4 for DS; 3 with S |
| b2 | control | 3 with 4 for F; 3 with S |
| b2/3 | control | 3(F) with 3 (Bi(F) for Bi(F) |
| b3 | control | 3 with 4 for Bi(F) |
| b4 | control | 3 with 4 for TV |
| b5 | control | 3 with 4 for StR |
| c1 | control | 3 and DS |
| c2 | control | 3 and F |
| c3 | control | 3 and Bi(F) |
| c4 | control | 3 and TV |
| c5 | control | 3 and StR |
| do1 | outgoing data | 4 with Interface |
| do2 | outgoing data | 4 with codec F |
| do3 | outgoing data | 4 with codec Bi(F) |
| do4 | outgoing data | 4 with Decoder TV |
| do5 | outgoing data | 4 with Decoder StR |
| di1 | incoming data | Interface with 4 |
| di2 | incoming data | Codec F with 4 |
| di3 | incoming data | Codec Bi(F) with 4 |
| eo | outgoing digital data | Interface and DS |
| ei | incoming digital data | DS and Interface |
| fo | outgoing analog speech-signals | Codec F and F |
| fi | incoming analog speech-signals | F and Codec F |
| go | outgoing analog video-signals | Codec Bi(F) and Bi(F) |
| gi | incoming analog video-signals | Bi(F) and Codec Bi(F) |
| ho | outgoing analog video-signals | Decoder TV and TV |
| io | outgoing analog tone-signals | Decoder StR and StR |
| k | control | 31 and 34 |
| l | control | 32 and 34 |
| m | control | 33 and 34 |
| X | control k, l, m | 31, 32, 33(DS) with 34(F) 34(DS) with 31, 32, 33(F) |

It will be understood that the above description of the present invention is susceptible to various modifications, changes and adaptations, and the same are intended to be comprehended within the meaning and range of equivalents of the appended claims.

What is claimed is:

1. In a digital, time-multiplex communications network operating simultaneously for a plurality of different kinds of user instruments and having a decentralized exchange and a plurality of user stations, with each user station being associated with at least one user instrument of at least one kind of user instruments and being provided with separate signal conducting lines for the conduction of signals in the transmitted and received directions, respectively, of the respective station, the network further having autonomous units including identical channel occupation check units each connected in a respective station and identical groups of devices each composed of a connection control member and a format converter, with each said group being connected to a respective user instrument and being connected to the channel occupation check unit in the user station of its respective user instrument, the improvement comprising: in each said user station, at least one set of devices composed of an additional connection control member connected to said channel occupation check unit associated with said station, and a storage register set connected to said separate signal conducting lines in said respective user station for the conduction of signals in the transmitted and received directions, respectively, said storage register set of each said station being further connected to said additional connection control member of the same station as well as to said connection control member of one said group of devices connected to a respective user instrument of said same station for control; and, in each said user station, a switching unit attached and connected to said user instrument which is connected to said one group of devices.

2. An arrangement as defined in claim 1 wherein at least several of the user instruments associated with one said user station, including that user instrument connected to said one group of devices, operate in the same bandwidth range, and further comprising means providing transverse connections between those connection control members associated with user instruments operating in the same bandwidth range, and further comprising the improvement wherein said additional connection control member is constituted by one of said connection control members associated with a user instrument operating in said same bandwidth range.

3. An arrangement as defined in claim 1 wherein said switching unit in at least one said station is a self acting switching unit.

* * * * *